US012149027B2

(12) United States Patent
Winey

(10) Patent No.: US 12,149,027 B2
(45) Date of Patent: Nov. 19, 2024

(54) HIGH FREQUENCY CONNECTOR WITH KICK-OUT

(71) Applicant: FCI USA LLC, Etters, PA (US)

(72) Inventor: Jordan Winey, Middletown, PA (US)

(73) Assignee: FCI USA LLC, Etters, PA (US)

( * ) Notice: Subject to any disclaimer, the term of this patent is extended or adjusted under 35 U.S.C. 154(b) by 60 days.

(21) Appl. No.: 17/967,755

(22) Filed: Oct. 17, 2022

(65) Prior Publication Data

US 2023/0042161 A1 Feb. 9, 2023

Related U.S. Application Data

(63) Continuation of application No. 17/164,782, filed on Feb. 1, 2021, now Pat. No. 11,476,619, which is a (Continued)

(51) Int. Cl.
*H01R 13/639* (2006.01)
*H01R 13/40* (2006.01)

(Continued)

(52) U.S. Cl.
CPC ........... *H01R 13/639* (2013.01); *H01R 13/40* (2013.01); *H01R 13/502* (2013.01);

(Continued)

(58) Field of Classification Search
CPC .... H01R 13/639; H01R 13/40; H01R 13/502; H01R 13/6272; H01R 13/6592; H01R 43/26

(Continued)

(56) References Cited

U.S. PATENT DOCUMENTS 4,548,451 A 10/1985 Benarr et al.
5,112,251 A * 5/1992 Cesar ................ H01R 13/6593 439/607.41

(Continued)

FOREIGN PATENT DOCUMENTS

CN 201181768 Y 1/2009
CN 102160245 A 8/2011

(Continued)

OTHER PUBLICATIONS

Chinese Office Action dated Nov. 30, 2022 in connection with Chinese Application No. 201910653106.4.

(Continued)

*Primary Examiner* — Peter G Leigh
(74) *Attorney, Agent, or Firm* — Wolf, Greenfield & Sacks, P.C.

(57) ABSTRACT

Embodiments disclosed herein relate to a high frequency connector system with reduced stub lengths that provide improved performance at high frequencies. A first connector includes a plurality of mating contacts designed to electrically connect to a second plurality of mating contacts associated with a second connector. The first connector includes one or more elastic members such that when the second connector is mated to the first connector, the one or more elastic members are compressed between the first and second connectors. The first and second plurality of contacts overlap by a first distance when initially mated, but when the connectors are released, the first elastic member biases the second connector away from the first connector such that the first and second plurality of contacts overlap by a second distance smaller than the first distance.

20 Claims, 8 Drawing Sheets

Related U.S. Application Data continuation of application No. 16/516,619, filed on Jul. 19, 2019, now Pat. No. 10,910,770.

(60) Provisional application No. 62/701,400, filed on Jul. 20, 2018.

(51) Int. Cl.
*H01R 13/502* (2006.01)
*H01R 13/627* (2006.01)
*H01R 13/6592* (2011.01)
*H01R 43/26* (2006.01)

(52) U.S. Cl.
CPC ..... *H01R 13/6272* (2013.01); *H01R 13/6592* (2013.01); *H01R 43/26* (2013.01)

(58) Field of Classification Search
USPC .......................................................... 439/352
See application file for complete search history.

(56) References Cited

U.S. PATENT DOCUMENTS 5,139,427 A 8/1992 Boyd et al.
5,308,252 A 5/1994 Mroczkowski et al.
5,358,411 A 10/1994 Mroczkowski et al.
5,484,295 A 1/1996 Mowry et al.
5,498,166 A 3/1996 Rothenberger
5,653,598 A 8/1997 Grabbe
6,029,344 A 2/2000 Khandros et al.
6,042,387 A 3/2000 Jonaidi
6,068,514 A 5/2000 Zuin
6,077,089 A 6/2000 Bishop et al.
6,102,726 A * 8/2000 Tsuji .................. H01R 13/6272 439/352
6,109,956 A 8/2000 Kawase et al.
6,142,802 A 11/2000 Berg et al.
6,146,151 A 11/2000 Li
6,241,542 B1 6/2001 Nishide et al.
6,257,915 B1 * 7/2001 Endo .................. H01R 13/6272 439/352
6,280,225 B1 * 8/2001 Nishide ................ H01R 13/641 439/352
6,345,987 B1 2/2002 Mori et al.
6,358,081 B1 3/2002 Saka et al.
6,383,009 B2 5/2002 Kawase et al.
6,474,997 B1 11/2002 Ochiai
6,475,014 B2 * 11/2002 Tsuji .................... H01R 13/641 439/352
6,494,732 B2 12/2002 Kashiyama et al.
6,517,372 B1 * 2/2003 Jones ................... H01R 13/635 439/352
6,527,578 B2 * 3/2003 Kashiyama .......... H01R 13/641 439/352
6,537,098 B2 * 3/2003 Kashiyama .......... H01R 13/641 439/352
6,561,833 B2 * 5/2003 Saka .................. H01R 13/6272 439/352
6,638,098 B2 10/2003 Yamaoka
6,645,005 B2 11/2003 Wu
6,743,040 B1 6/2004 Nakamura
6,843,659 B2 1/2005 Liao et al.
6,877,992 B2 4/2005 Grant et al.
6,893,270 B2 5/2005 Sercu
6,905,343 B1 6/2005 Neidich
6,916,181 B2 7/2005 Brown et al.
7,025,601 B2 4/2006 Dittmann
7,090,503 B2 8/2006 Dittmann
7,128,580 B2 10/2006 Liao et al.
7,179,126 B2 2/2007 Chen
7,396,236 B2 7/2008 Eldridge et al.
7,628,617 B2 12/2009 Brown et al.
7,649,368 B2 1/2010 Eldridge et al.
7,722,398 B2 5/2010 Ma
7,766,668 B1 8/2010 Bishop
8,195,017 B2 * 6/2012 Kaneshiro ............ G02B 6/4201 385/88
8,292,669 B2 10/2012 Wang
8,597,056 B2 12/2013 Blanchfield
8,647,141 B2 2/2014 Lee et al.
8,780,581 B2 7/2014 Merz et al.
8,860,454 B2 10/2014 Oniyama et al.
9,172,161 B2 10/2015 Walden et al.
9,190,776 B2 11/2015 Lee et al.
9,277,649 B2 3/2016 Ellison
9,306,334 B2 4/2016 Zhu
9,337,585 B1 5/2016 Yang
9,425,525 B2 8/2016 Walden et al.
9,509,089 B2 * 11/2016 Mathews ........... H01R 13/6335
9,509,094 B2 11/2016 Mathews et al.
9,553,401 B2 * 1/2017 Mathews ............. H01R 12/772
9,560,760 B2 1/2017 Wig
9,680,266 B2 6/2017 Tomada
9,680,273 B2 6/2017 Light et al.
9,882,303 B1 * 1/2018 Chalas ................. H01R 13/424
9,948,026 B2 4/2018 Mathews et al.
9,985,367 B2 * 5/2018 Wanha ............... H01R 13/6461
10,116,080 B1 10/2018 Ju et al.
10,135,199 B1 11/2018 Ju
10,148,024 B2 12/2018 Ju et al.
10,249,988 B2 4/2019 Craton
10,716,213 B2 7/2020 Kim et al.
10,910,770 B2 2/2021 Winey
11,476,619 B2 10/2022 Winey
2003/0003779 A1 1/2003 Rathburn
2004/0127073 A1 7/2004 Ochiai
2004/0157476 A1 8/2004 Maldonado et al.
2004/0252477 A1 12/2004 Brown et al.
2005/0153600 A1 7/2005 Lu
2005/0170674 A1 8/2005 Lu
2005/0208786 A1 9/2005 Dittmann
2005/0208787 A1 9/2005 Dittmann
2005/0208788 A1 9/2005 Dittmann
2006/0024987 A1 2/2006 Huang et al.
2006/0042821 A1 3/2006 Pax
2006/0063431 A1 3/2006 Yang
2006/0105631 A1 5/2006 Yang
2007/0054515 A1 3/2007 Williams
2007/0075717 A1 4/2007 Kinghorn et al.
2007/0232091 A1 10/2007 Hong
2008/0153343 A1 6/2008 Kobayashi et al.
2009/0134895 A1 5/2009 Miller
2011/0100694 A1 5/2011 Regnier et al.
2012/0040563 A1 2/2012 Wang et al.
2012/0156938 A1 6/2012 Zhang
2012/0171890 A1 * 7/2012 Kurachi ................. H01R 12/88 439/372
2013/0143420 A1 6/2013 Light et al.
2013/0237092 A1 9/2013 Rubens
2013/0309906 A1 11/2013 Geest
2014/0273641 A1 9/2014 Light et al.
2015/0072562 A1 3/2015 Little et al.
2015/0147895 A1 5/2015 Hanna
2015/0333460 A1 11/2015 Regnier et al.
2017/0025204 A1 * 1/2017 Chapman ............. C09D 127/18
2017/0194721 A1 7/2017 Fan et al.
2018/0006406 A1 * 1/2018 Craton ................... H01R 43/26
2018/0026413 A1 1/2018 Dambach et al.
2020/0028302 A1 1/2020 Winey
2020/0227850 A1 7/2020 Do et al.
2020/0227851 A1 7/2020 Do et al.
2021/0021818 A1 1/2021 Lee et al.
2021/0091496 A1 3/2021 Cartier, Jr. et al.
2021/0218188 A1 7/2021 Winey
2021/0234291 A1 7/2021 Zerebilov

FOREIGN PATENT DOCUMENTS

CN 102377053 A 3/2012
CN 202564699 U 11/2012
CN 103250306 A 8/2013
CN 105024215 A 11/2015
CN 105098426 A 11/2015

(56) References Cited

FOREIGN PATENT DOCUMENTS

| | | | | | |
|---|---|---|---|---|---|
| CN | 105576450 | A | 5/2016 | | |
| CN | 107278344 | A | 10/2017 | | |
| CN | 107636905 | A | 1/2018 | | |
| CN | 201910653106.4 | | 11/2022 | | |
| EP | 0 903 811 | A1 | 3/1999 | | |
| KR | 10-1425931 | B1 | 8/2014 | | |
| TW | M551365 | U | 11/2017 | | |
| TW | M560709 | U | 5/2018 | | |
| TW | 108125742 | | 1/2023 | | |
| WO | WO2005/048409 | A1 | 5/2005 | | |
| WO | WO 2014/146134 | A1 | 9/2014 | | |
| WO | PCT/US2016/012937 | | 4/2016 | | |
| WO | WO-2018045026 | A1 * | 3/2018 | ............. | H01R 12/59 |
| WO | WO-2018118738 | A1 * | 6/2018 | ............. | H01R 12/62 |
| WO | PCT/US2020/013508 | | 5/2020 | | |
| WO | PCT/US2020/013487 | | 6/2020 | | |

OTHER PUBLICATIONS

International Search Report and Written Opinion for International Application No. PCT/US2016/012937 mailed Apr. 25, 2016.
International Preliminary Report on Patentability for International Application No. PCT/US2016/012937 mailed Jul. 27, 2017.
International Search Report and Written Opinion for International Application No. PCT/US2020/013508 mailed May 14, 2020.
International Search Report and Written Opinion for International Application No. PCT/US2020/013487 mailed Jun. 8, 2020.
Taiwanese Office Action dated Jan. 9, 2023 in connection with Taiwanese Application No. 108125742.

* cited by examiner

HIGH FREQUENCY CONNECTOR WITH KICK-OUT

CROSS-REFERENCE TO RELATED APPLICATIONS

This application is a continuation claiming the benefit of U.S. application Ser. No. 17/164,782, filed Feb. 1, 2021, and entitled "HIGH FREQUENCY CONNECTOR WITH KICK-OUT," which is hereby incorporated herein by reference in its entirety. U.S. application Ser. No. 17/164,782 is a continuation claiming the benefit of U.S. application Ser. No. 16/516,619, filed Jul. 19, 2019, and entitled "HIGH FREQUENCY CONNECTOR WITH KICK-OUT," which is hereby incorporated herein by reference in its entirety. U.S. application Ser. No. 16/516,619 claims the benefit under 35 U.S.C. § 119(e) of U.S. Provisional Application Ser. No. 62/701,400, filed Jul. 20, 2018, and entitled "HIGH FREQUENCY CONNECTOR WITH KICK-OUT," which is hereby incorporated herein by reference in its entirety.

FIELD

Disclosed embodiments are related to improvements to latched plug connectors, such as may be used in electrical systems.

BACKGROUND

Electrical connectors are designed to facilitate the physical connection between two conductors to allow an electrical signal to pass between the two. Some electrical connectors include one or more latches that engage with reciprocal features on a corresponding mating connector. When the connectors are mated, the latch and reciprocal feature engage to ensure that the connectors do not become inadvertently disconnected.

SUMMARY

According to some embodiments, a connector comprises a mating interface adapted to mate with a second connector pressed towards the connector in a mating direction, the mating interface comprising: a plurality of contacts; an elastic member adjacent the mating interface positioned with respect to the mating interface to be deformed in the mating direction by the second connector when mated with the connector; and a latching member positioned to engage a complementary latching member of the second connector. The latching member is positioned with respect to the plurality of mating contacts such that the second connector is positioned with respect to the plurality of mating contacts by the elastic member and the latching member.

In another aspect, the connector is embodied as part of an interconnection system comprising: a first connector and a second connector configured to be mated to the first connector, wherein the first and second connectors each comprise a first and second plurality of contacts and are configured with a travel distance, wherein the first connector comprises a first elastic member, and the first elastic member is constructed and arranged to bias the second connector away from the first connector when the second connector is mated to the first connector such that the first and second plurality of contacts overlap to provide a stub length shorter than the travel distance.

In yet another aspect, the connector is embodied within a connector assembly comprising: a first connector and a second connector, wherein one of the first and second connectors comprises a plug on a cable assembly comprising a cable configured for operation at frequencies in excess of 15 GHz, the second connector being constructed and arranged to be mated to the first connector, and the first connector comprises a latch receiving opening, and the second connector comprises a latch with a lock tab, wherein the first connector further comprises a first elastic member, the first elastic member being constructed and arranged to bias the second connector away from the first connector when mated to the first connector causing the lock tab to engager with the latch receiving surface.

According to another aspect, a connector can be used in a method of operating an interconnection system comprising a first connector and a second connector, wherein the first connector has mating contacts positioned to engage with mating contacts in the second connector, the method comprising: inserting the second connector into the first connector such that an elastic member is compressed between the first connector and the second connector, releasing the second connector such that the elastic member presses the second connector away from the first connector; engaging latching features of the first connector and latching features of the second connector such that the mating contacts of the first connector are positioned relative to the mating contacts of the second connector based on the position of the latching features of the first connector and the second connector.

It should be appreciated that the foregoing concepts, and additional concepts discussed below, may be used separately or together in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
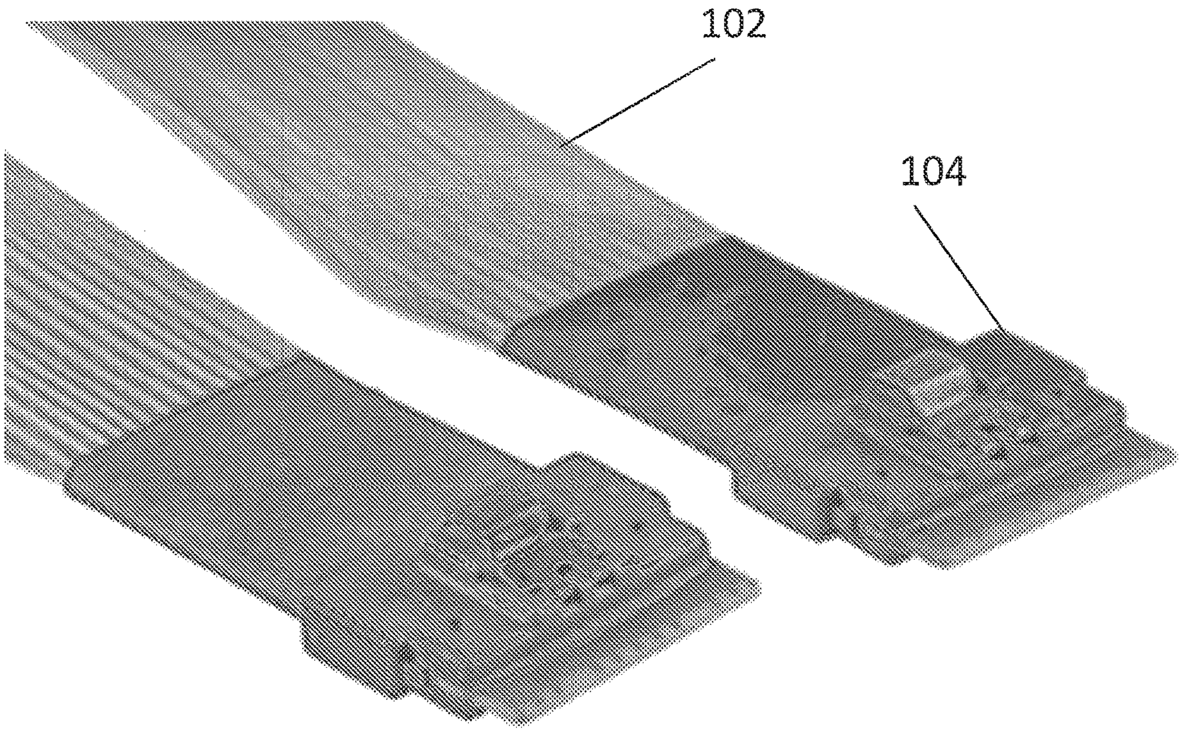
FIG. 1 is a perspective view of a representative cable connector including the high frequency connector according to one embodiment.

The inventors have recognized and appreciated that improved performance of a connector may be achieved with a "kick-out." The kick-out urges mated connectors apart such that the mated position of the connectors is set by a latching mechanism on the connectors. The latching mechanism may establish the relative position of the mated connectors, and along with them, the mating contacts within the connectors. The mating contacts may be positioned relative to the latching mechanisms such that, when the connectors are blocked by the latching mechanisms from separating further, the mating contacts will be engaged with only short electrical stub length, contributing to desirable electrical performance, particularly at high frequencies. Nonetheless, as the connectors are pushed together, before they are urged apart by the kick-out, there may be substantial wipe, which further contributes to connector performance.

A "stub" is a conducting branch in a signal path that is open at the end. The stub is undesirable because signal energy propagating down the signal path will split at the branch, such that part of the energy propagates down the stub. At the end of the stub, the signal energy is reflected back toward the signal path where it mixes with and interferes with the desired signal. The severity of that interference depends on the length of the stub in relation to the wavelength of the signal energy. When the length of the stub approximates one half of the wavelength, the interference can be particularly severe because the reflected energy from the stub cancels out some portion of the signal energy.

A stub arises in an electrical connector, for example, when a mating contact shaped as a beam mates with a mating contact shaped as a pad. The connector cannot be manufactured such that the beam will reliably touch the end of the pad. Rather, the connector is designed such that the beam mates with the pad at a distance offset from the end that exceeds the variance in positioning of the beam and pad that will arise during use of the connector. That positioning ensures that, even with the maximum variance in positioning, the beam and pad still mate. However, the portion of the pad between its distal tip and the contact point with the beam remains as a stub.

Further, during a mating sequence, it is desirable for the conducting elements of each conductor to make initial contact prior to the connectors being fully mated and for the conductors to slide along each other for a certain distance before the connectors are fully mated. This distance between where the conductors first contact and where the conductors connect when finally mated is known as the travel distance or the wipe length, but for the purposes of this disclosure it will be referred to as the travel distance. This sliding removes contaminates, like dirt or oxides, from the contact surfaces. Hence, having a travel distance can be beneficial for electrical performance. Nonetheless, the travel distance corresponds to the length of the stub that is left when the conducting elements are in their mated position.

Connectors might be designed with a nominal travel distance of 2 to 5 mm. Such a travel distance in a conventional connector corresponds to stub around a half wavelength for signals at frequencies above 30 GHz. As many modern connectors operate with signal frequencies in that range, the stub length is long enough to create significant interference with the signals at the operating frequency of the connector.

A connector with kick-out can still have travel distances as in the prior art, if desired. However, once the connectors are not being actively pressed together, the kick-out will separate the connectors to a controlled position in which the stub length is less than the travel distance. Such connectors can be reliably designed for operating at high frequencies, such as above 15 GHz, for example in the range of 30 to 120 GHz, or up to 112 GHz or up to 80 GHz.

In some embodiments, the kick-out may be implemented as one or more elastic elements between the connectors. A first connector may include a mating interface adapted to mate with a second connector when the second connector is pressed towards the first connector in a mating direction. The first connector may include at least a first elastic member adjacent the mating interface, positioned with respect to the mating interface such that the elastic member is deformed in the mating direction when the two connectors are pressed together. For purposes of this disclosure, the mating direction of each connector is defined as towards the other connector. The elastic member continuously biases the second connector opposite the mating direction or away from the first connector. The second connector is biased into a latched position that both reduces stub length and ensures a consistent mating between the two connectors, as will be described below.

In some embodiments, in the process of mating a first connector to a second connector, the mating ends of the respective connectors are brought together. As the first and second connector come together, the contacts of the first connector make initial contact with the contacts of the second connector. As the connectors mate, the contacts of the first connector wipe along the contacts of the second connector. Also, at least one latching member of the first connector makes initial contact with the housing of the second connector.

The head of the latching member is beveled, rounded, curved, or otherwise outwardly sloped to form a lock tab such that when the head encounters a component of the second connector, the latching member is forced away from that component. The latching member can continue to slide with the latching member head in contact with a component of the second connector as the connectors mate, until the latching member reaches a window in a latching component of the second connector. That latching component may be, for example, a surface of the housing or a portion a of a shield surrounding the housing. Due to the elasticity of the latching member, the latching member springs back into a position with the head of the latching member extending at least into, and potentially partially through, the window of the second connector. The connectors may reach a maximum mating depth when the housings of the connectors prevent additional movement towards each other.

As will be further described, when a user releases the two connectors, the second connector is then biased by at least one elastic member between the connectors in a direction opposite of the mating direction such that the first and second connectors may separate slightly. As the connectors separate, a flat mating surface of the lock tab, facing the opposite the mating direction, encounters a latch receiving surface at an edge of the window, preventing the latching member from moving further in a direction opposite the mating direction.

Prior to the movement of the second connector as a result of the elastic members, the contacts of the first connector were at a first overlap length with the contacts of the second connector when the connectors were in the initial mated position. As the connectors separate due to biasing from the elastic members, the first contacts wipe in a direction opposite the mating direction against the second contacts until the connectors enter a latched position when the latching surface meets the latch receiving surface. In the latched position, the first contacts and the second contacts overlap by a second overlap length, shorter than the first length, reducing the remaining stub length of the second contacts.

In some embodiments of the connector, the connector includes at least a first and second elastic member. In these embodiments, a projection of the housing of the first connector extends from the housing in a direction perpendicular to the mating direction. The first elastic member is an elongated member wrapped at least partially around the projection. The elastic member is secured to the connector by a cage in some embodiments such that the elastic member is held between the cage and the housing. The elongated member can comprise a central portion flanked by a first end portion and a second end portion. When the elastic member is in a rest state prior to being reversibly deformed by the second connector, the first end portion and the second end portion of the elastic member extend above the projection in a direction opposite the mating direction. When the second connector is mated to the first connector, the second connector presses the elastic member in the mating direction, reversibly deforming the central portion in the mating direction. Due to the elastic nature of the elastic member, when the user releases the second connector, the elastic member biases the second connector away from the first connector such that the latching surface engages with the latch receiving surface.

The kick-out components may generate a force at least as great as the de-mate force of the connectors, for example, at least 20 N. For the purposes of this disclosure, de-mate force can be defined as the force sufficient to cause the first and second connectors, while in the mated position, to move opposite the mating direction. The required force may be generated by selection of the spring constant of the elastic members forming the kick-out. In some embodiments the force exerted by the elastic members collectively may be less than or equal to 50 N, less than or equal to 40 N, less than or equal to 30 N, less than or equal to 20 N, less than or equal to 10 N, or less than or equal to 5 N. In some embodiments, the force may be greater than or equal to 5 N, greater than or equal to 10 N, greater than or equal to 20 N, greater than or equal to 30 N, greater than or equal to 40 N, or greater than or equal to 50 N, Combinations of the above-referenced ranges are also possible (e.g., greater than or equal to 5 N and less than or equal to 50 N).

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a representative cable connector equipped with the connector of the current disclosure. The cables 102 could be shielded twinax cables, but other cable types are contemplated as well. The connector 104 according to one embodiment is attached at the end of the cables to facilitate electrical/signal conduction to other receiving connectors. While a certain connector shape, cable thickness, cable shape, number of cables, and configuration is depicted, it should be understood that FIG. 1 is merely representative. The connector of the current disclosure could be embodied in a variety of ways, and the current disclosure is not limited to the depicted representation.

FIG. 1 is an example of a cable assembly terminated with a plug connector that may be used with a kick-out as described herein. In this example, the plug connector has a mating interface formed as a printed circuit board with contact pads on one or both surfaces. Such a mating interface may form stubs when mated to a receptacle connector having beams positioned to contact that pads. Moreover, the plug connector comprises a latching member that may set the relative position of the plug and receptacle when mated.

Figure 2:
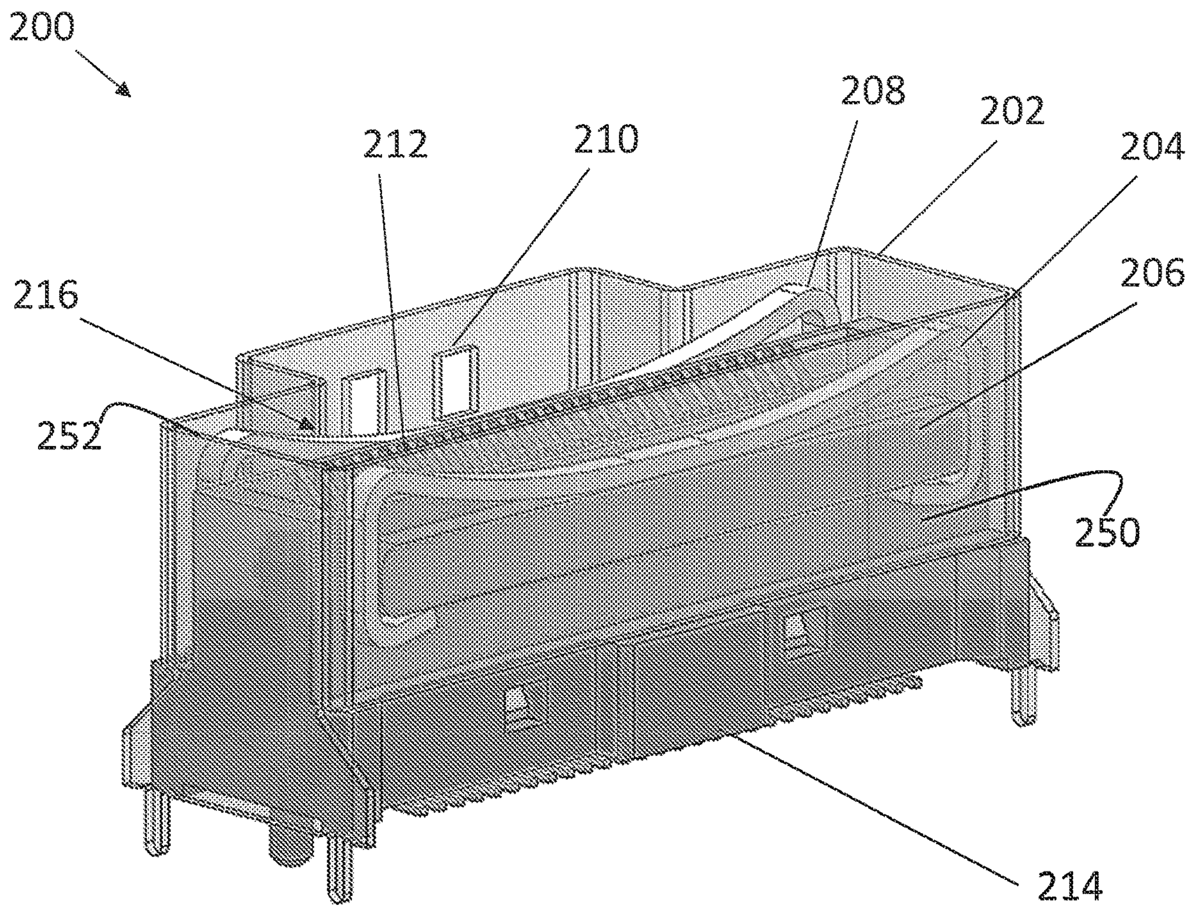
FIG. 2 is a top, front, left, perspective view of a connector with its housing made transparent, according to one embodiment.

FIG. 2 is the first connector or the receptacle connector according to one embodiment. The connector 200 comprises a housing 214. Housing 214 may be molded from an insulative material or made using other known techniques. In the embodiment, housing 214 has a slot, lined with contacts 212 that will engage pads of plug connector 104. Contacts 212 may have mating contact portions that are cantilevered, with contact surfaces on the beams formed at the distal ends of contacts 212. Contact tails may extend from a surface of housing 214, forming a mounting interface. In this example, the contact tails are surface mount tails, visible under housing 214. Intermediate portions of contacts 212 may electrically couple the contact tails to the mating contact portions and may also be secured in housing 214. When the two connectors are mated, the contacts 212 of the first connector make electrical contact with the contacts of the second connector, such as, for example, the pads of connector 104 (FIG. 1).

In the embodiment illustrated, a cage 202 surrounds housing 214, with side walls 250 and end walls 252. Cage 202 has contact tails at the mounting interface of connector 200. With these tails, cage 202 may be conductive and grounded, such that cage 202 may provide a shielding function. Additionally, cage 202 may be shaped to act as a latching component. Windows 210 in the cage 202 may receive latching members from the second connector as will be described below. Cage 202 may be formed from a sheet of metal or other suitable material. FIG. 2 shows cage 202 as partially opaque such that other portions of the connector may be seen.

Connector 200 may be shaped to support one or more elastic members to provide kick-out. In this example, housing 214 has projections 206 for that purpose. Projections 206 extend from the housing perpendicularly to the mating direction. In the example of FIG. 2, only one such projection is visible, but the opposing side may have a similar projection.

In the embodiment illustrated, two elastic members are shown. Each is formed of an elongated member that has been bent into a shape that will deform and generate a spring force. The elastic members may be formed of any material that will elastically deform, but preferably does not yield, when compressed during mating of the connectors. Many metals may be suitable for this purpose.

First elastic member 204 is positioned adjacent one side of the mating interface 216, while the second elastic member 208 is positioned adjacent the opposite side of the mating interface 216. The elastic members are positioned with respect to the mating interface to be deformed in the mating direction by a second or plug connector when mated with the first connector.

Elastic members may be secured to connector 200 in any suitable way. Side walls 250 of cage 202 covers an end of the projections 206, aiding in securing the elastic members. In the embodiment illustrated, elastic members 204 and 208 are wrapped around portions of all four sides of projections 206. The ends of projections 206 are bounded by, at one end, a wall of housing 214 and, at the other end, cage 202. In this way, elastic members are secured to connector 200, though portions of the elastic members 204 and 208 may move perpendicular to the mating direction.

Figure 3:
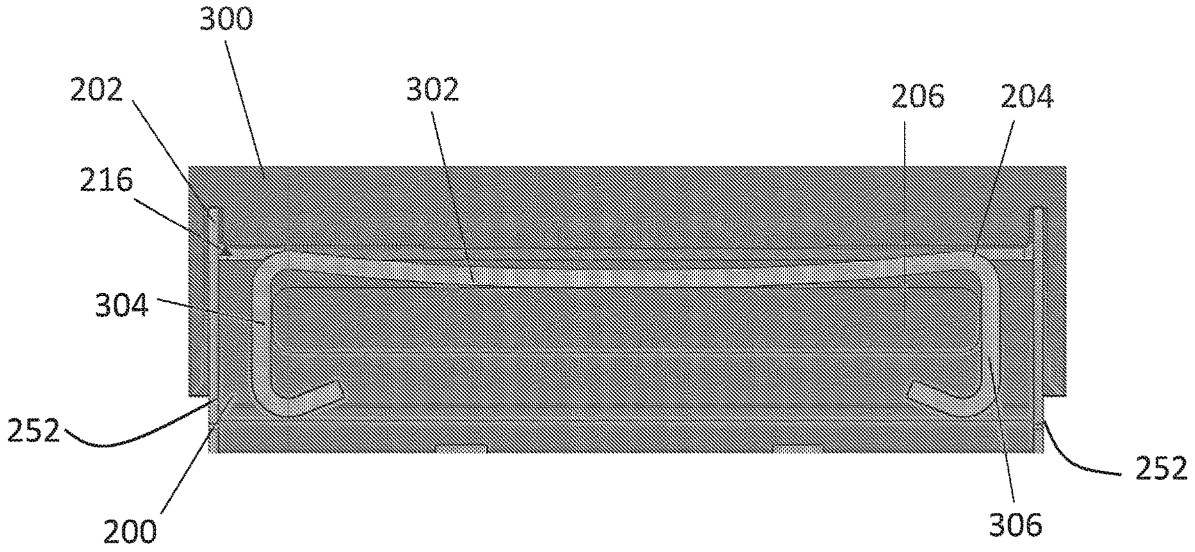
FIG. 3 is a side view of a mating interface between the connector of FIG. 2, with cage 202 partially cutaway, and a mating plug connector.

FIG. 3 shows a side view of the mating interface of connector 200. Cage 202 is shown with sidewalls 250 cut away to reveal elastic member 204. In FIG. 3, second connector 300 is pressed fully into first connector 200. In this configuration, some portion of each of the two connectors may abut such that further motion of the connectors towards each other is blocked. In this example, a portion of the housing of connector 300 is abutting the walls of cage 202. Here, sidewalls 252 are shown abutting surfaces of the insulative housing making up connector 300. However, it should be appreciated that depending on the shape and position of various components, different or additional surfaces may abut to block further insertion of connector 300 into connector 200. Regardless of how the position of maximum insertion is defined, in this configuration, elastic member 204 is deformed and is storing spring energy to kick-out connector 300.

As can be seen, central portion 302 of the elastic member 204 is bowed, with the apex of the bow contacting projection 206. With a mating connector pressed against elastic member 204, the ends of central portion 302 are similarly pressed towards projection 206, elastically deforming elastic member 204, causing it to exert a counter spring force on the mating connector 300. Elastic member 204 can be seen to be in a compressed state in FIG. 3 by comparing the shape of the elastic member 204 in FIG. 3 to that in FIG. 2.

First end portion 304 and second end portion 306 of the elastic member wrap around the projection 206. When in a resting, undepressed, state first end portion 304 and second end portion 306 extend above projection 206 in a direction opposite the mating direction. 302. First end portion 304 and second end portion 306 engage the surface of a mating connector such that, when a mating connector is pressed by a user into connector 300, the ends of central portion can be deformed towards the projection 206 in the mating direction.

Figure 4A:
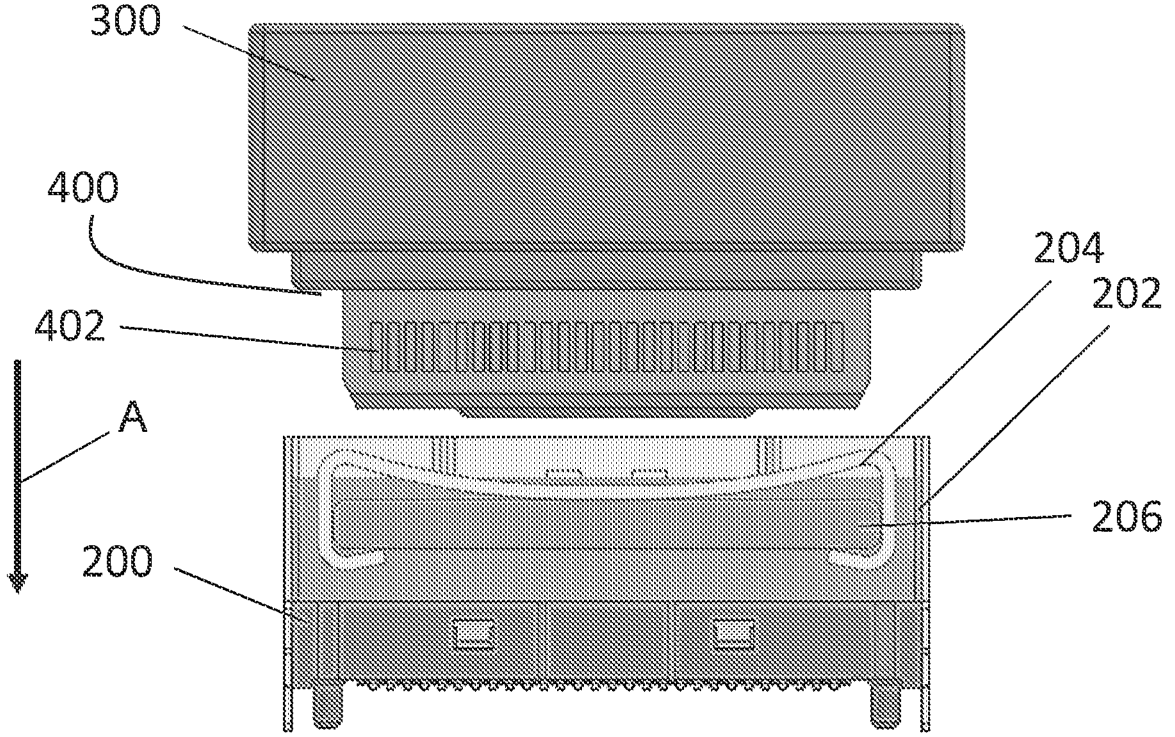
FIG. 4A is a front view of the connector of FIG. 1 prior to mating with a corresponding second connector.

FIG. 4A illustrates a portion of a mating sequence as a user presses a connector 300 towards connector 200 to mate the two connectors that precedes the view of FIG. 3. FIG. 4A shows elastic member 204 in a resting, un-deflected state. As the second connector 300 mates with the first connector 200, surface 400 of the housing of the second connector presses against portions of the central portion of the elastic member that are raised above projection 206 to compress it into the state shown in FIG. 3.

FIG. 4A shows the mating interface on second connector 300 with contacts 402. Here contacts 402 are pads, such as may be formed on a paddle card of a cable assembly plug, as is known in the art. During insertion from the state shown in FIG. 4A to the state shown in FIG. 3, contact surfaces of contacts 212 will slide along contacts 402 by a travel distance.

During mating, a user may press connectors 200 and 300 together until the state shown in FIG. 3 is reached. In this condition, the contacts have slid relative to each other by the travel distance, such that the distal portions of contacts 402 extend beyond the contact point by that travel distance. A stub of comparable length is thus formed. However, wipe is provided, which removes contaminants form the contact surfaces.

Figure 4B:
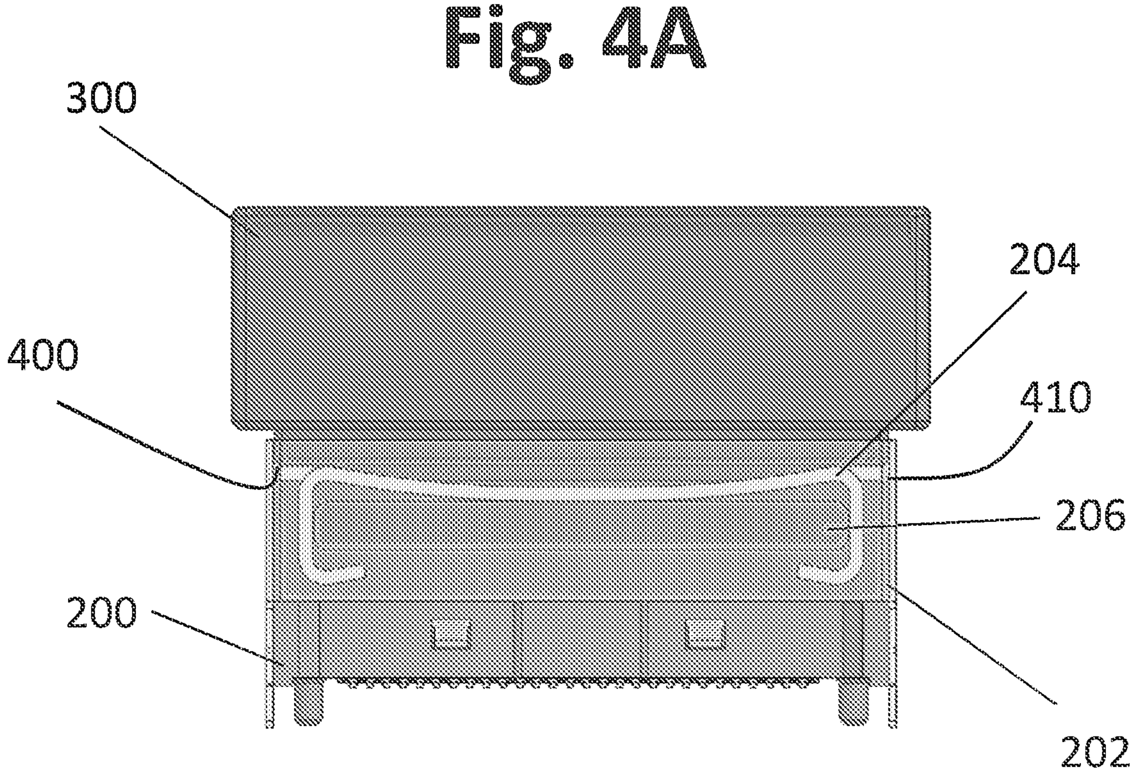
FIG. 4B is a front view of the connector of FIG. 1 when mated with the corresponding second connector of FIG. 3A.

The initial insertion depth, as illustrated in FIG. 3, has the deepest possible mating distance between the two connectors, as the housings of the two connectors mechanically prevent any further mating depth. The user may then stop pressing the connectors together. Without an external force pressing the connectors together, the spring force stored in the elastic members, as described above in connection with FIG. 3, may then kick-out connector 300 from connector 200. Connector 300 will not be kicked entirely out of connector 200. Rather, it will move to a position dictated by the latching components of connectors 200 and 300. FIG. 4B shows the two connectors in this position. As can be seen by a comparison of the figures, elastic member 204 is deflected relative to the rest state of FIG. 4A, but has less deflection relative to the compressed state of FIG. 3.

In the mated configuration of FIG. 4B, the connectors are mated with the pads of connector 300 inside the housing of connector 200 where they are contacted by contacts 212 (FIG. 2). However, as can be seen by the gap 410 between the housings of connectors 200 and 300, the connector 200 is not inserted as deeply into connector 200 as in the state of FIG. 3. Therefore, the contact surfaces of contacts 212 are no longer separated from the distal ends of contacts 402 by the travel distance. Rather, the separation is less, meaning that any stub that is formed is shorter than the travel distance once connector 300 has been kicked out.

Figure 5B:
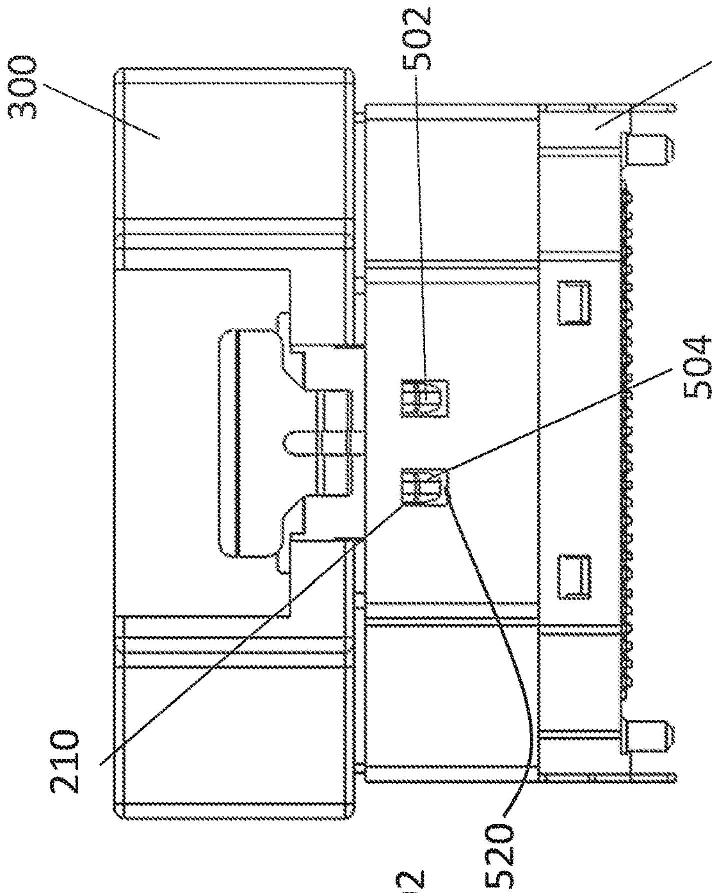
FIG. 5B is a front schematic view of the mated connectors of FIG. 5A in the latched position after the second connector is biased away from the first connector.
Figure 5A:
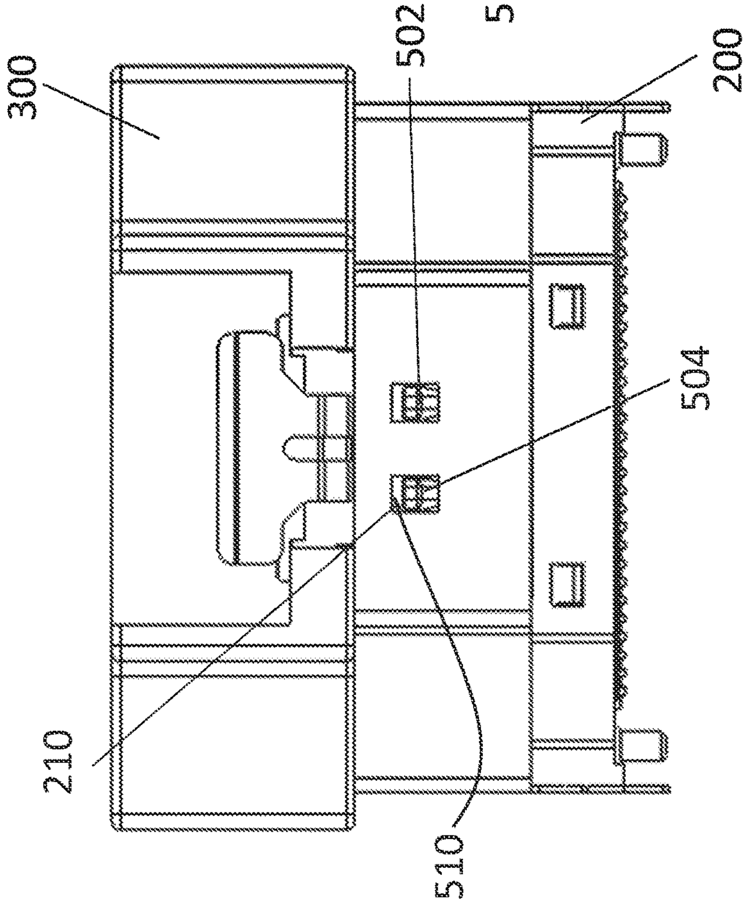
FIG. 5A is a front schematic view of the mated connectors in the initial mated position prior to the second connector being biased away from the first connector.

FIGS. 5A-5B and 6A-6B illustrate how the mating position of FIG. 4B is established and how the elastic members operate to reduce the stub length. FIG. 5A shows the connectors, with side walls of the cage in place. Further, FIG. 5A shows the connectors from the side containing latching features, which is opposite from the side illustrated in FIG. 4A.

In FIG. 5A, first and second latching members 502 and 504 are visible in windows 210. In the embodiment illustrated, latching members 502 and 504 have hook-shaped projections. In the embodiment illustrated, latching members 502 and 504 are coupled to connector 300. They are elongated in the mating direction and are positioned to fit behind a side wall 250 of cage 202. Additionally, they are flexible in a direction perpendicular to the mating direction and normal to side surface 250 of cage 202. The projections of latching members 502 and 504 have leading ends that are ramped, providing a camming surface that, when connector 300 is inserted into connector 200, causes latching members 502 and 504 to deflect away from surface 250. The housing of connector 300 is shaped with a relieved portion to receive latching members 502 and 504 when deflected away from surface 250 in this way. As a result, latching members 502 and 504 do not impede motion of connector 300 towards connector 200, and connector 300 may be inserted into connector 200 until the initial mating position, illustrated in FIG. 3, is achieved.

As can be seen in FIG. 5A, when connector 300 is inserted sufficiently far into connector 200, the hook shaped projections of latching members 502 and 504 align with windows 210. Once in window 210, the projections are no longer pressed away from the side surface 250 of cage 202. Accordingly, the projections spring back into windows 210 and, depending on the relative thickness of the material forming cage 202 and the height of the projections, may partially extend through windows 210.

Windows 210 and latching members 502 and 504 are sized and positioned on connector 200 and 300, respectively, such that when connectors 200 and 300 are in the position illustrated in FIG. 3, a rearward edge of the projections of latching members 502 and 504 are separated from the facing edges of windows 210 by a space 510. In this configuration the relative position of the connectors 200 and 300 is set by features of the connectors independent of the latching members and complementary latching components on the connectors.

Figure 6A:
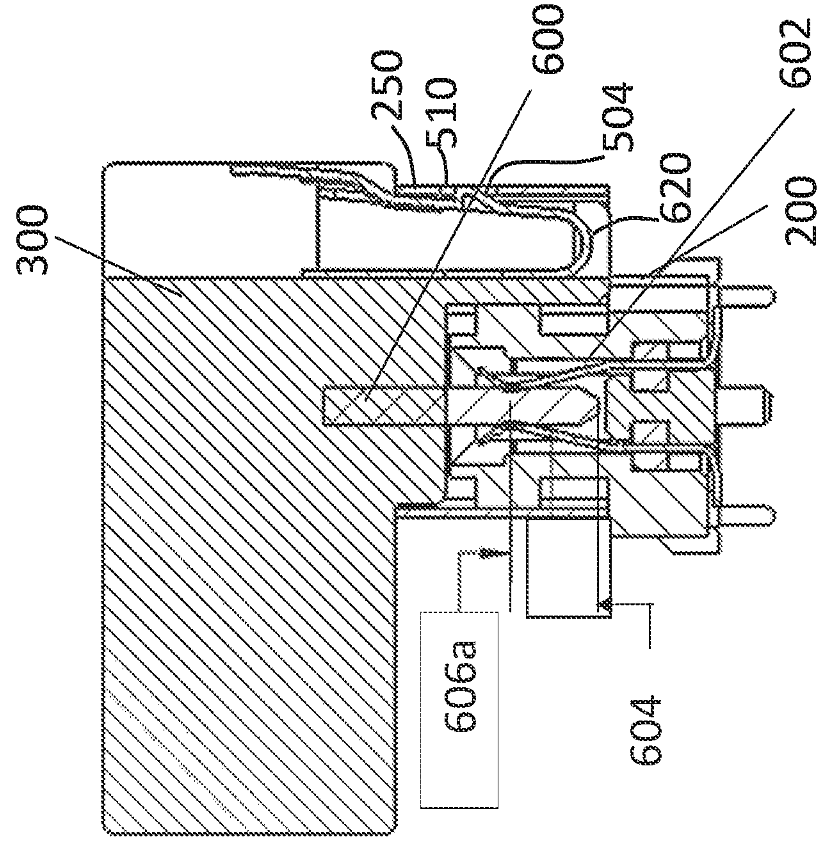
FIG. 6A is a side schematic view of the mated connector of FIG. 4A in the initial mated position.
Figure 6B:
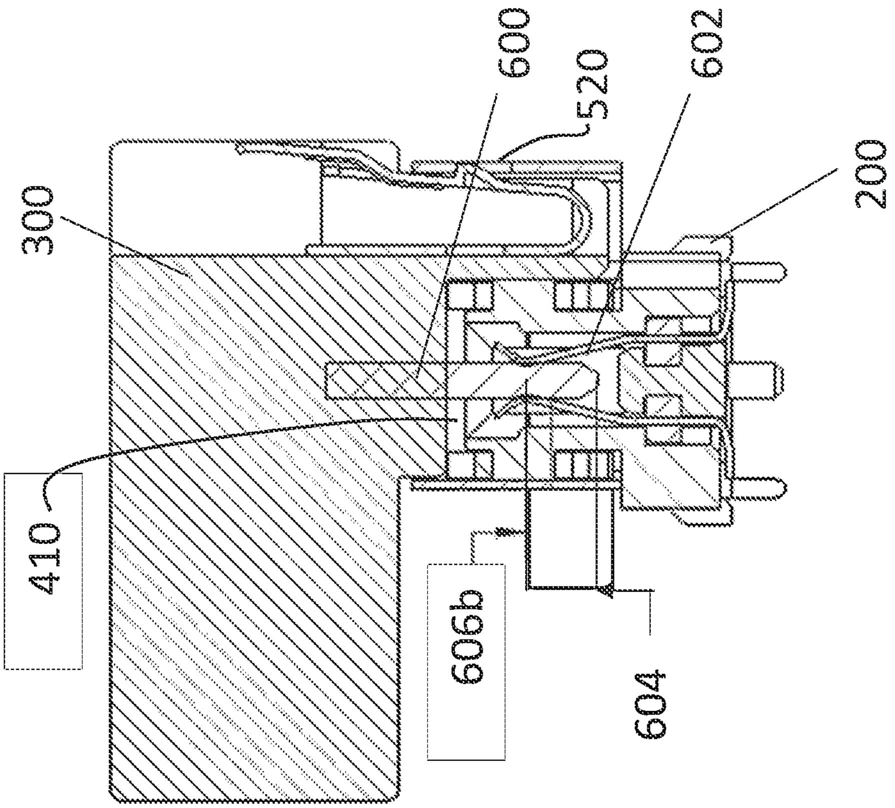
FIG. 6B is a side schematic view of the mated connector of FIG. 6A in the latched position.

In contrast, FIGS. 5B and 6B illustrate a configuration in which the relative position of the connectors 200 and 300 is set by latching members 502 and 504 and windows 210. As illustrated, connector 300 has been kicked-out as in the configuration of FIG. 4B. In that configuration, the projections of latching members 502 and 504 abut the facing edges of windows 210. Accordingly, space 510 is not present in that configuration. Rather, because of the motion of connector 300, a space 520 exists between the distal end of latching members 502 and 504 and the opposite edges of windows 210.

The rear edges of the projections of latching members 502 and 504, abutting the edges of windows 210, may be perpendicular to the surface of the side 250 or otherwise shaped to hook on the edge of the windows 210. Regardless of the precise configuration of the projection, because the projections at least partially extend into the windows 210, they hook on the edges of the windows and preclude connector 300 from being further kicked out. Thus, the connectors 200 and 300 are pushed into this position, set by the positions of the latching components by the elastic members 204 and 208. The mating contacts of connectors 200 and 300 are positioned relative to the latching components so that the stub length is small when the connector is in this configuration.

FIGS. 6A and 6B illustrate how the stub length is reduced. FIG. 6A is a cross section of the mating interface in the configuration of FIG. 5A. In this cross section, latching member 504 is visible. In this configuration, latching member is formed from an elongated member 620 that is attached to the housing of connector 300 at one end. The other end of elongated member 620 curls over upon itself creating an inwardly facing surface and an outwardly facing surface. The inwardly facing surface presses against the housing of connector 300 and the outwardly facing surface has a projection formed in it. That projection is positioned to enter a window 210, as shown in FIG. 5A.

The elongated member 620 may be formed from a springy material, such as a metal sheet. As shown, the projection has a tapered leading portion which will press the projection away from surface 250 until the projection enters window 210. Once projection enters window 210, that pressure will be removed and the springiness of elongated member 620 will force the projection into window 210, as shown in FIG. 6A. FIG. 6A represents the position of connectors as illustrated in FIG. 5A and FIG. 3. Accordingly, space 510 between the rearward edge of the projection and the facing edge of window 210 is visible.

In contrast, FIG. 6B illustrates the mating interface in the configuration of FIG. 5B. As can be seen in that configuration, there is a space 510 has been removed, but space 520 is present. Similarly, gap 410 is now present. As can be seen, the relative position of connectors 200 and 300 is set by the spacing of the projection on elongated member 620 and the edge of window 210 on which the projection is hooked. The reduction in stub length can be seen by a comparison of FIGS. 6A and 6B.

The mating contacts of connector 300 are represented by contact array 600, which is shown in cross section. The contact array, for example, may be a paddle card carrying contacts 402 as shown in FIG. 4. Those contacts may be pads. However, the exact configuration of the contacts is not critical to the invention. The leading edge of the contacts is indicated by reference line 604.

Mating contacts from connector 200 are shown as contacts 602, which are here shown as surface mounted beams. However, the exact configuration of the contacts is not critical to the invention. Regardless of the exact shape, the contacts from connector 200 and connector 300 have a contact location. The contact location is here shown be reference line 606*a*. The distance between reference line 606*a* and reference line 604 represents the travel distance and also the stub length when connector 300 has been fully inserted into connector 200.

The contact location in the configuration of FIG. 6B is shown by reference line 606*b*. The distance between reference line 606*b* and reference line 604 represents the stub length when connector 300 has been kicked-out of connector 200 and the relative position of the connectors is set by the latching components. This stub length is shorter than the stub length in FIG. 6A by the width of the gap 410. This decrease in stub length increases the frequency at which undesirable stub reflections interfere with operation of the connector, extending the operating frequency of the connector. Further, the wipe length has not been affected. To the contrary, the wipe length is increased, as there is some wipe as the connectors are pushed into the fully inserted position and additional wipe as connector 300 is kicked-out and slides opposite the mating direction.

As a comparison of FIGS. 6A and 6B illustrates, when a user has mated the two connectors and releases the two connectors, there is no longer a force holding the two connectors in the fully inserted position. At this point, because of the spring constant of the elastic members 204 and 208, the elastic members exert a spring force to partially de-mate the second connector, causing it to move relative to the first connector opposite the mating direction. Thus, the connectors reach the latched position shown in FIGS. 5B and 6B. The connectors may be held in this position, with a shorter stub length for operation, as a result of the elastic members 204 and 208 continuously biasing the connectors into this position.

Figure 7A:
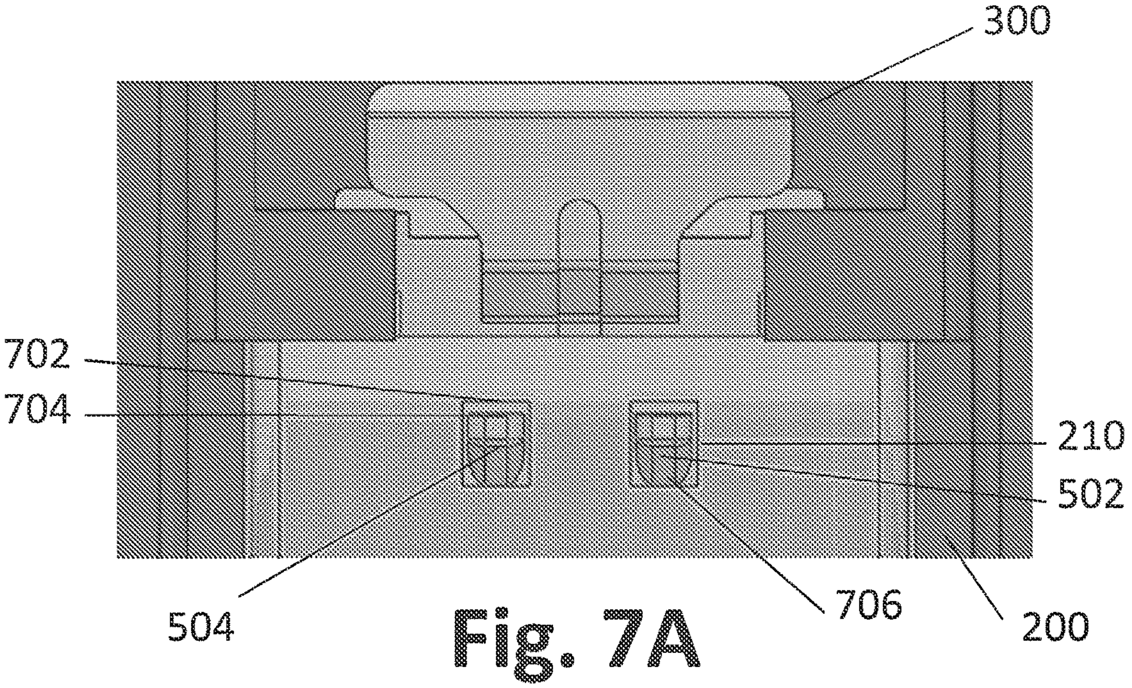
FIG. 7A is partial close-up view of the mated connector of FIG. 4A in the initial mated position.
Figure 7B:
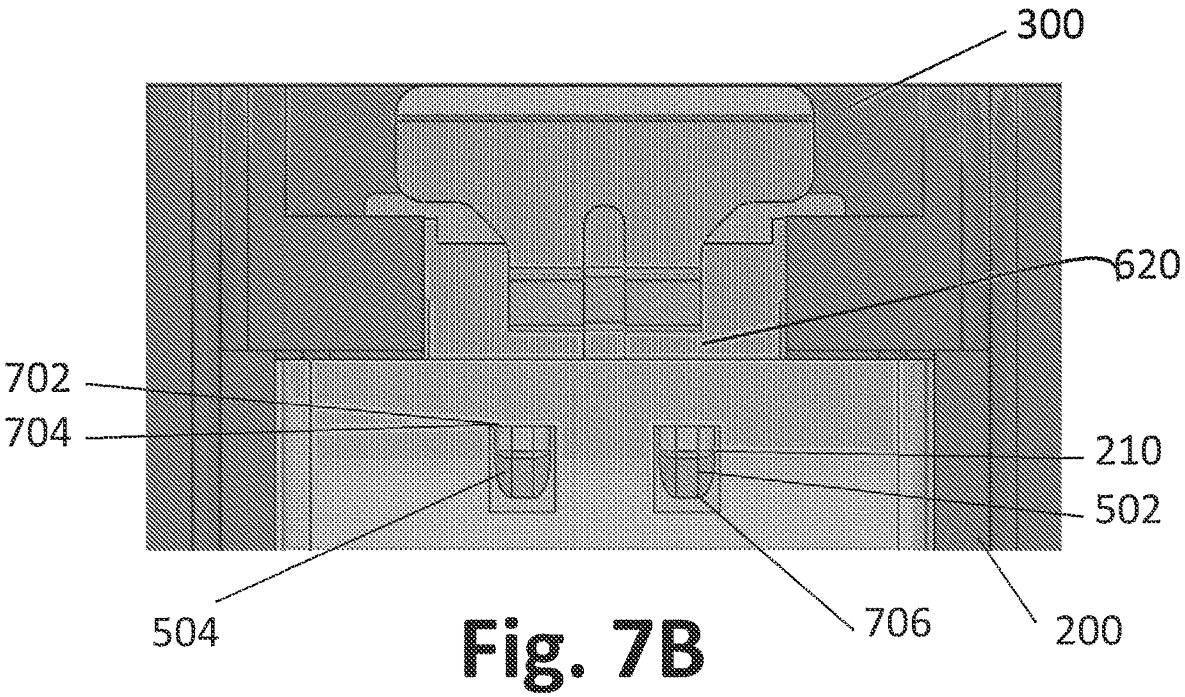
FIG. 7B is a partial close-up view of the mated connector of FIG. 4B in the latched position.

FIGS. 7A and 7B provide an enlarged view of a latching interface between the two connectors, in accordance with some embodiments. Latching members 502 and 504 included sloped heads 706. When the second connector is moving towards the first connector, the sloped heads 706 act as lock tabs that make initial contact with cage 202. The slope of the heads cause the latching members to reversibly deform towards the body of the second connector, allowing the latching members to continue sliding downwards. In this depressed configuration, the latching members continue attempting to return to their undepressed position, and thus slide along the inner surface of cage 202. When the latching members reach windows 210, they are free to undeform, resulting in their undepressed configurations with sloped heads 706 protruding from windows 210. As can be seen, the proximal end of the sloped head 704 is flat and faces opposite the mating direction. This flat surface serves as a latching surface of the latching member. When the second connector is biased opposite the mating direction away from the first connector, the latching surface 704 encounters the proximal end of the window 210, which acts as the latching receiving member 702. The latch receiving member is constructed and arranged to be complementary to the latching surface and receiving the latching surface when the two connectors are in the latched position seen in FIG. 7B. As a result of the latching surface being biased into direct contact with the latch receiving member 702, the two connectors maintain a secure mated connection facilitated by the elastic members biasing the connectors into maintaining the latched position.

Figure 8A:
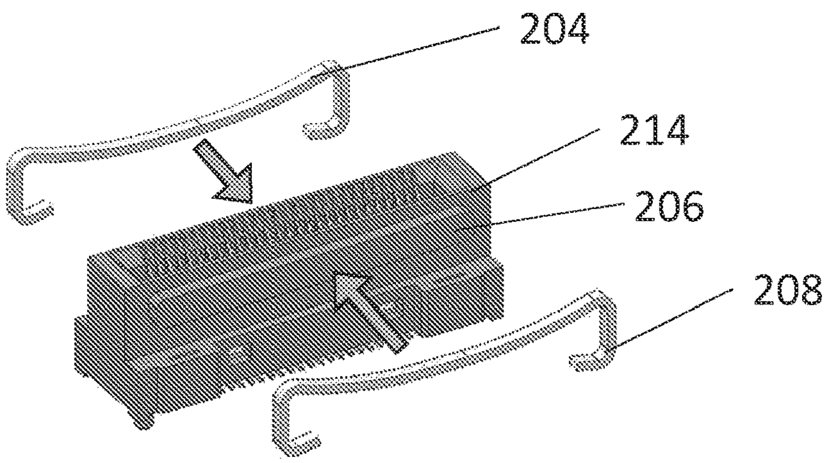
FIG. 8A is a top, front, left perspective view of the elastic members being attached to the connector.
Figure 8B:
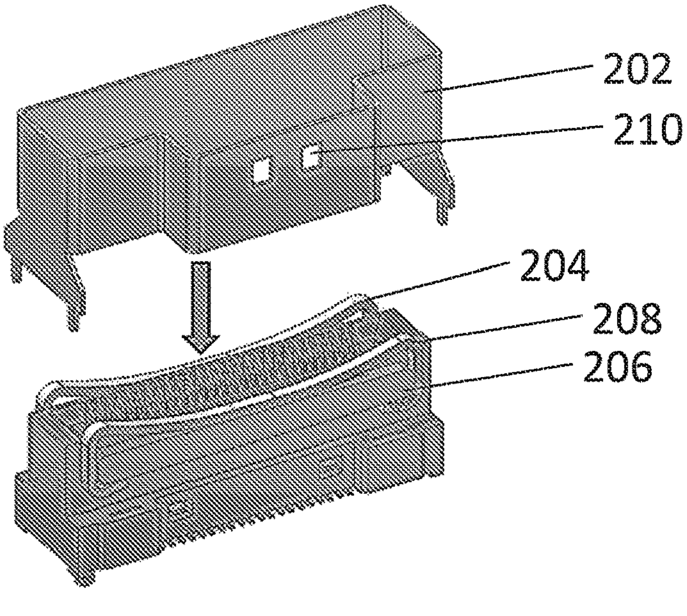
FIG. 8B is a top, front, left, perspective view of a cage being lowered over the connector to complete the connector.
Figure 8C:
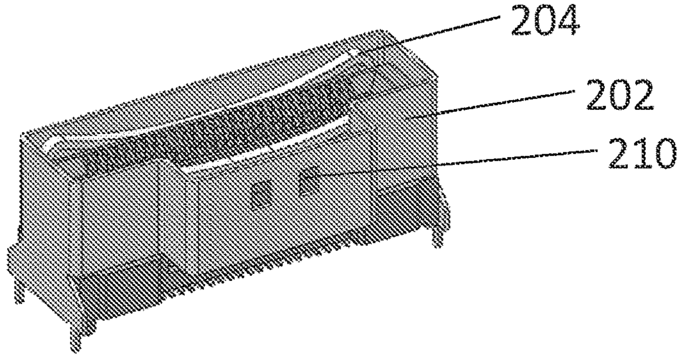
FIG. 8C is a top, front, left, perspective view of the completed connector.

FIGS. 8A to 8C show an exemplary assembly method of the first connector according to some embodiments. Elastic members 204 and 208 are first wrapped at least partially around projections 206 of the first connector housing 214. The cage 202 is then lowered over the rest of the housing 214 and finally disposed around the housing to hold the elastic members between the cage and the rest of the housing.

The contacts of the first connector are positioned relative to the contacts of the second connector based on the relative position of the latching features of the first and second connectors. Similarly, the separation of the first and second connectors is established by the relative positions of the latching features. According to some embodiments, the first connector is inserted into the second connector such that the elastic members are compressed between the two connectors. The user then releases the connectors such that the elastic members bias the second connector away from the first connector, causing the latching surface of the second connector to engage the latch receiving surface of the first connector. The movement of the connectors away from each other changes the relative positions of the first and second contacts, reducing the stub length. In some embodiments, the stub length in the operating condition of the connector may be 1.5 mm, for example. Additionally, the contacts are wiped with respect to each other a second time, with the first time in the mating direction when the connectors were initially mating for a first travel distance of 2 mm, and a second time in the opposite direction as a result of entering the latched position in a second travel distance less than the first travel distance.

In some embodiments the final stub length in the latched position may be 5 mm, less than or equal to 4 mm, less than or equal to 3 mm, less than or equal to 2 mm, less than or equal to 1.5 mm, less than or equal to 1 mm. In some embodiments, the stub length may be greater than or equal to 1 mm, greater than or equal to 1.5 mm, greater than or equal to 2 mm, greater than or equal to 3 mm, greater than or equal to 4 mm, or greater than or equal to 5 mm. Combinations of the above-referenced ranges are also possible (e.g., greater than or equal to 1 mm and less than or equal to 5 mm). Other ranges are also possible.

In some embodiments the initial travel distance when the connectors are entering the initial latched position may be up to 10 mm, up to 9 mm, up to 8 mm, up to 7 mm, up to 6 mm, up to 5 mm, up to 4 mm, up to 3 mm, or up to 2 mm, in various embodiments. In some embodiments, the initial travel distance may be greater than or equal to 2 mm, greater than or equal to 3 mm, greater than or equal to 4 mm, greater than or equal to 5 mm, or greater than or equal to 6 mm, greater than or equal to 7 mm, greater than or equal to 8 mm, greater than or equal to 9 mm, or greater than or equal to 10 mm. Combinations of the above-referenced ranges are also possible (e.g., greater than or equal to 2 mm and less than or equal to 10 mm). Other ranges are also possible.

It should be understood that while specific male and female connectors are described, the current disclosure does not specifically focus on a single of the two connectors or even necessarily describes the connectors as separate entities. The two connectors could be embodied as separate connectors, or as parts of a single connector assembly.

The interlocking system including the latching interface and the elastic members biasing the connectors into a locked position can also be a system separate to the physical depicted embodiments of the two connectors. One of skill in the art should understand that the teachings provided can be applied to different connector shapes and systems than those expressly outlined here and the current disclosure should not be limited to the structures and shapes described.

While the depicted and described embodiments show a first and second elastic member, it should be understood by one of skill in the art that any number of elastic members can be used as long as the elastic member(s) are capable of generating the necessary de-mate force to bias the connectors into the latched position.

The improved electrical performance of the described connectors are contemplated for operation at frequencies in excess of 15 GHz. However, frequencies of below 15 GHz are also contemplated. At frequencies of 10-15 GHz, the connector is contemplated to have an impedance variation of less than ±5%.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention.

For example, inventive concepts are illustrated with respect to a vertical connector assembly that is designed for attachment to a printed circuit board using surface mount technology. However, the kick-out as described herein may be used with right angle connectors and/or with connectors attached to a board using other technologies, such as press fit or BGA attachments.

Moreover, the kick-out is illustrated in connection with a receptacle adapted to receive a plug of a cable assembly. The techniques described herein may be used with other styles of connectors, including backplane connectors and mezzanine connectors, and other connectors configured to join two printed circuit board.

As an example of another variation, in some embodiments, the elastic members were described as spring clips. However, helical springs, chunks of elastic material, or any other structure capable of generating a spring force may alternatively or additionally be used.

Further, it should be appreciated that embodiments were illustrated in which elastic members were attached to a receptacle and latches were attached to a plug. These features may be on either or both of the mating connectors.

As yet another example, mating connectors were illustrated as a plug and receptacle. In connection with such an embodiment, relative motion of the connectors was sometimes described as insertion or removal of the plug from the receptacle. While such a mode of operation is common, the invention is not limited to embodiments in which a plug is pushed towards a receptacle, as the techniques described herein operate regardless of which component is fixed and which is moving.

As yet another example, latching members 502 and 504 may be formed on a single elongated member 620 or two separate elongated members may be used.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A connector comprising:

a mating interface adapted to mate with a complementary structure when the connector is pressed toward the complementary structure in a mating direction, the mating interface comprising a plurality of mating contacts; and a latching member positioned to engage a complementary latching member of the complementary structure, wherein:

the latching member is positioned with respect to the plurality of mating contacts such that the plurality of mating contacts are positioned with respect to the complementary structure by the latching member;

the connector is constructed and arranged to bias the connector away from the complementary structure such that the connector is positioned with respect to the complementary structure based on the latching member; and the plurality of mating contacts are configured as beams with contact surfaces at a discrete, fixed location on the beams in the mating direction with respect to the latching member.

2. The connector of claim 1, wherein the complementary structure comprises at least a portion of a second connector.

3. The connector of claim 1, wherein the connector and the complementary structure are constructed and arranged to bias the connector away from the complementary structure with a force of at least 10 N when the connector and complementary structure are engaged to one another.

4. The connector of claim 1, wherein the connector is constructed and arranged to continuously bias the connector away from the complementary structure when the connector and the complementary structure are engaged to one another.

5. The connector of claim 1, wherein the connector further comprises a plurality of compliant members configured to store spring force when the connector is engaged with the complementary structure such that the connector is biased away from the complementary structure.

6. The connector of claim 1, wherein:
the connector is a cable connector; and
the complementary structure comprises a board mount structure.

7. The connector of claim 6, wherein the cable connector comprises a shielded twinax cable.

8. A structure configured to receive a connector, the structure comprising:
a mating interface adapted to mate with the connector when the connector is pressed toward the structure in a mating direction, the mating interface comprising a plurality of mating contacts; and
a latching member positioned to engage a complementary latching member of the connector, wherein:
the latching member is positioned with respect to the plurality of mating contacts such that the connector is positioned with respect to the plurality of mating contacts by the latching member; and
the structure comprises at least one spring member constructed and arranged to bias the connector away from the structure with a force of at least 10N when the connector is pressed towards the structure, such that the connector is biased into a second position with respect to the structure based on the latching member.

9. The structure of claim 8, wherein the structure comprises at least a portion of a second connector.

10. The structure of claim 8, wherein the structure comprises a mounting interface configured to be disposed on a printed circuit board.

11. The structure of claim 8, wherein connector comprises a complementary plurality of mating contacts configured as beams with contact surfaces at a fixed location in the mating direction with respect to the complementary latching member.

12. The structure of claim 8, in combination with the connector,
wherein:
the connector comprises a complementary plurality of mating contacts; and
one of:
(a) the plurality of contacts comprises a plurality of contact pads; or
(b) the complementary plurality of mating contacts comprises a plurality of contact pads.

13. An interconnection system, comprising:
a connector; and
a complementary structure configured to be mated with the connector, wherein:
the connector and the complementary structure comprise a plurality of mating contacts and a complementary plurality of contacts respectively; and
at least one spring member between the connector and the complementary structure constructed and arranged to bias the connector away from the complementary structure with a force of at least 10 N when the connector is mated to the complementary structure.

14. The interconnection system of claim 13, wherein the complementary structure comprises at least a portion of a second connector.

15. The interconnection system of claim 13, wherein the complementary structure comprises a mounting interface configured to be disposed on a printed circuit board.

16. The interconnection system of claim 13, wherein the plurality of mating contacts are configured as beams with contact surfaces at a fixed location in the mating direction with respect to a latching member of the connector.

17. The interconnection system of claim 13, wherein the connector is constructed and arranged to continuously bias the connector away from the complementary structure when the connector is mated to the complementary structure.

18. The interconnection system of claim 13, wherein:
the connector comprises a latching member; and
the complementary structure comprises:
a mating interface adapted to mate with the connector, the mating interface configured to receive the connector when pressed toward the complementary structure in a mating direction and comprising the complementary plurality of contacts; and
a complementary latching member positioned to engage the latching member of the connector;
the connector and the complementary structure are constructed and arranged to bias the connector away from the complementary structure such that the latching member engages with the complementary latching member, and a separation of the connector and the complementary structure in the mating direction is established by the latching member and the complementary latching member.

19. The interconnection system of claim 13, wherein:
the connector is a cable connector; and
the complementary structure is a board mount structure configured to receive the cable connector.

20. The interconnection system of claim 13, wherein the connector and the complementary structure are configured to pass signals in excess of 15 GHz.

* * * * *